United States Patent [19]

Arbib et al.

[11] 4,168,027
[45] Sep. 18, 1979

[54] ALUMINIUM SOLDERING

[75] Inventors: Gordon F. Arbib; Bernard M. Allen, both of Hemel Hempstead, England

[73] Assignee: Multicore Solders Limited, Hemel Hempstead, England

[21] Appl. No.: 848,355

[22] Filed: Nov. 3, 1977

Related U.S. Application Data

[62] Division of Ser. No. 605,811, Aug. 19, 1975, Pat. No. 4,070,192.

[30] Foreign Application Priority Data

Aug. 19, 1974 [GB] United Kingdom ............... 36461/74
Oct. 30, 1974 [GB] United Kingdom ............... 47048/74

[51] Int. Cl.² .................... B23K 35/28; B23K 35/368
[52] U.S. Cl. ..................................... 228/224; 228/263
[58] Field of Search ..................... 228/263, 223–224; 75/166 C, 166 D

[56] References Cited

U.S. PATENT DOCUMENTS

| 2,238,069 | 4/1941 | Miller | 148/23 |
|---|---|---|---|
| 2,756,497 | 7/1956 | Gale | 148/23 |
| 2,880,126 | 3/1959 | Jordan et al. | 148/23 |
| 3,768,141 | 10/1973 | Schmartz | 228/263 X |
| 3,865,641 | 2/1975 | Aronberg | 148/23 |
| 4,032,059 | 6/1977 | Plegat | 228/263 X |

Primary Examiner—C. W. Lanham
Assistant Examiner—Kenneth J. Ramsey
Attorney, Agent, or Firm—Finnegan, Henderson, Farabow & Garrett

[57] ABSTRACT

There is described a method of soft soldering aluminium or alloys thereof using a fluxed solder composition. The fluxed solder composition comprises a soldering flux suitable for use in soft soldering aluminium and its alloys and a soft solder alloy of lead, tin and silver and, optionally, up to 3% copper. The composition of the soft solder alloy is such that it contains at least 35% lead and 10% tin, and x% silver wherein $x = 0.1 + (5 \times 10^{-4})(Sn)^2 + (1 \times 10^{-5})(Sn)^3$, (Sn) being the percentage by weight of tin in the alloy.

14 Claims, 2 Drawing Figures

× = LESS THAN 25 DAYS' ENDURANCE (SHORT LIFE)
□ = BETWEEN 25 AND 50 DAYS (INTERMEDIATE OR UNCERTAIN LIFE
○ = OVER 200 DAYS (LONG LIFE)

× = LESS THAN 25 DAYS' ENDURANCE (SHORT LIFE)
□ = BETWEEN 25 AND 50 DAYS (INTERMEDIATE OR UNCERTAIN LIFE)
○ = OVER 200 DAYS (LONG LIFE)

ALUMINIUM SOLDERING

This is a division of application Ser. No. 605,811, filed Aug. 19, 1975, now U.S. Pat. No. 4,070,192.

BACKGROUND OF THE INVENTION

This invention relates to the soldering of aluminium or aluminium alloys and, more particularly, is concerned with a method of soldering aluminium or aluminium alloys using fluxed solder compositions, and with fluxed solder compositions for use in said method.

There have been proposed a number of solder alloys which are said to be suitable for soldering a member made of aluminium or of an aluminium alloy to another member which latter member may or may not be of aluminium or of an aluminium alloy. These known solder alloys include the so-called "soft solders", which are solders melting below 350° C. The soft solders are generally preferable to the higher melting point "hard solders", and to the "brazing" and "welding" alloys, for any type of joint incorporating a member of aluminium or of an aluminium alloy since with soft solders the expansion, changes of temper and distortion of the member which may take place are less severe at lower temperatures. The use of soft solders also reduces the energy and time required to make a joint, bearing in mind that for aluminium the amounts of energy and time required increase rapidly with soldering temperature since aluminium has a relatively high specific heat. Furthermore, the lower the melting range of the solder used, the wider is the choice of suitable flux compositions which do not char during soldering. The low melting point of a soft solder also permits it to be used on heat-sensitive components such as those found in the electronics and electrical industries.

There are a wide range of metals which are generally recognised by those skilled in the art as being susceptible to soft soldering processes. Such metals include plain carbon steels, brass and copper alloys in general, and nickel alloys. With an appropriate soldering flux, stainless steels can also be soft soldered. Metals such as tungsten, titanium, molybdenum and chromium cannot usually be soft soldered.

Further information concerning the soft soldering of aluminium can be found in (i) Aluminum Soldering Handbook published by the Aluminum Association in New York in 1971 and in (ii) Soldering Aluminium published by the Aluminium Federation in London in 1968.

There are however two disadvantages which may arise from the use of the soft solders heretofore used for soldering aluminium or alloys of aluminium. Firstly, the corrosion resistance of joints made with most of these soft solders is not always satisfactory; failure tends to take place along the interface between the soft solder alloy and the aluminium member so that the electrical and/or mechanical connection across the joint may be lost. Secondly, these soft solder alloys often contain one or more elements (such as bismuth, zinc, cadmium or antimony) which are incompatible with certain other metals, alloys, solders or platings which may form one or more of the other members of a joint comprising an aluminium or aluminium alloy member. For example, antimony attacks zinc in brass, while bismuth, zinc and cadmium are liable to mix with any tin/lead solder which is present to produce a mixed alloy joint of unacceptable composition. National and International specifications for such soldered joints strictly prohibit more than incidental quantities of such elements. Furthermore, soft solder alloys containing one or more of bismuth, zinc, cadmium or antimony may not be ductile enough for production in large quantity in the form of thin solder wire or flux-cored solder wire, may not flow on and wet other members of different metals sufficiently well, and may reduce the corrosion resistance of the joint.

It is an object of the present invention to provide a fluxed soft solder composition suitable for soldering a member of aluminium or of an aluminium alloy to another metallic member, which soft solder composition has a melting point less than 300° C. and can provide a soldered joint with substantial corrosion resistance.

SUMMARY OF THE INVENTION

According to a first aspect of the present invention there is provided a fluxed solder composition suitable for soldering a member of aluminium or of an aluminium alloy to another metallic member, which fluxed solder composition comprises a flux suitable for use in aluminium soldering and a soft solder alloy, having a melting point of less than 300° C., comprising at least 35% by weight lead, at least 10% bt weight tin and x% by weight silver, where $x=0.1+(5\times10^{-4})(Sn)^2+(1\times10^{-5})(Sn)^3$, where (Sn) is the percentage by weight of tin in the soft solder alloy and, optionally, up to 3% by weight copper, the balance, if any, consisting of incidental elements and impurities.

According to a second aspect of the present invention there is provided a method of joining a first member made of aluminium or of an aluminium alloy to a second metallic member at a joint site, the method comprising the steps of (a) disposing said first and second members in the position in which they are to be joined, (b) providing at said joint site a fluxed solder composition according to the first aspect of the invention, and (c) soldering together said first and second members.

In the soft solder alloys used in the compositions according to the first aspect of the invention, the minimum quantity of silver in the alloy is determined by the amount of tin present. The Applicants have found that such a requirement is essential if the range of composition of the alloys of the invention is not to include some alloys of unsatisfactory corrosion resistance.

DETAILED DESCRIPTION OF THE INVENTION

Fluxed solder compositions and, in particular, flux-cored solder compositions are known. Fluxed solder compositions permit the introduction of both flux and alloy to the area of the joint site co-operatively and simultaneously and in constant proportions of flux to solder. They are commonly formed of a solder alloy and have associated therewith a quantity of a soldering flux, the arrangement being such that when the fluxed solder composition is applied to the joint site in the soldering process, the flux associated therewith flows progressively onto the joint site as the solder alloy of the fluxed solder composition is consumed, i.e. melted and solidified during the process. The fluxed solder composition is conveniently provided as an elongate member having a substantially uninterrupted core, or plurality of separate cores, of the flux, which core or cores extend longitudinally through the interior (as distinct from the surface) of the solder alloy. Fluxed solder compositions of this convenient form are herein referred to as flux-cored solder compositions. However, it should be understood that a fluxed solder composition can be constituted by an elongate member of the solder alloy coated with a quantity of the soldering flux or by an intimate mixture of a flux and a solder powder, the mixture being, for example, a dimensionally stable solid or even a paste or cream in the range of normal room temperatures. Flux-cored solder compositions may be made by extruding the solder alloy so as to form an elongate wire rod while simultaneously introducing flux cores into cavities in the wire or rod. The diameter of the extruded wire or rod may then be reduced by, for example, rolling or drawing.

Where reference is made herein to the melting point of an alloy, this should be understood to refer to the liquidus temperature of that alloy. The proportions of the elements contained in the soft solder alloy are expressed in this specification as percentages by weight of the alloy.

The soft solder alloy used in the invention contains at least 10% tin for a number of reasons. Firstly, such alloys are more easily drawn into flux-cored wires than are alloys having less than 10% tin. Furthermore, alloys with less than 10% tin having higher melting points which (i) increase the cost and difficulty of any preheating before soldering and (ii) increase the risk of overheating of heat-sensitive devices near the joint site. The ability of tin-lead solder alloys to wet and spread over aluminium surfaces is improved with tin contents over 10%.

An addition of up to 3% copper to the soft solder alloy may be useful to improve the strength and creep resistance of the solder alloy.

The fluxed solder composition of this invention may be a flux-cored solder member in the form of a stick, or a wire or ribbon which may be conveniently stored in coil form with or without a former. The fluxed solder composition may also be in the form of a particular shape selected for a special purpose and stamped or cut from a stick, wire or ribbon.

Conveniently, the requisite quantity of flux is incorporated in the solder alloy as one, or preferably as a plurality of, substantially continuous strands of flux extending longitudinally through the interior of the solder alloy. The fluxed solder composition of the invention may also take the form of a mixture of solder alloy powder and flux, with or without an additional carrier, and the mixture may take the form of, for example, a dimensionally-stable solid or a cream or paste.

Fluxes suitable for the soldering of aluminium and for inclusion in fluxed solder compositions according to the invention will generally be an organic flux of the type comprising (a) certain amines (e.g. diethylenetriamine) and (b) either fluoboric acid and/or certain salts of fluoboric acid, (e.g. ammonium fluoborate and zinc fluoborate) or certain alkali metal and/or ammonium halides (e.g. lithium chloride, ammonium chloride and sodium fluoride) and, optionally, (c) certain oxides, (e.g. zinc oxide or cadmium oxide); or a reaction flux of the type comprising (a) certain heavy metal chlorides, (e.g. stannous chloride and zinc chloride) and at least one of (b) certain alkali metal and/or ammonium halides (e.g. lithium chloride, aluminium chloride and sodium fluoride) and (c) certain reducing and/or wetting agents (e.g. hydrazine hydrochloride and oleic acid); or a mixture of an organic flux and a reaction flux.

In general, the organic flux will comprise from 20 to 80 parts by weight of amine(s), from 5 to 60 parts by weight of fluoboric acid and/or salt(s) thereof and optionally up to 15 parts by weight of metal oxide(s). The reaction flux will in general comprise from 50 to 90 parts by weight of heavy metal chloride(s) and optionally up to 50 parts by weight of alkali metal and/or ammonium halide(s) and/or up to 10 parts by weight of reducing and/or wetting agent(s).

Such aluminium soldering fluxes may be conveniently prepared in liquid form by diluting them in or suspending them in a suitable solvent (which may in some cases be water or an alcohol) in appropriate concentrations. Alternatively, the fluxes may be in solid form.

In order to test the corrosion resistance of a number of soldered joints made from various soft solder alloys, the investigations detailed below were undertaken. In the following description, reference will be made to the accompanying drawings in which.

Figure 1:
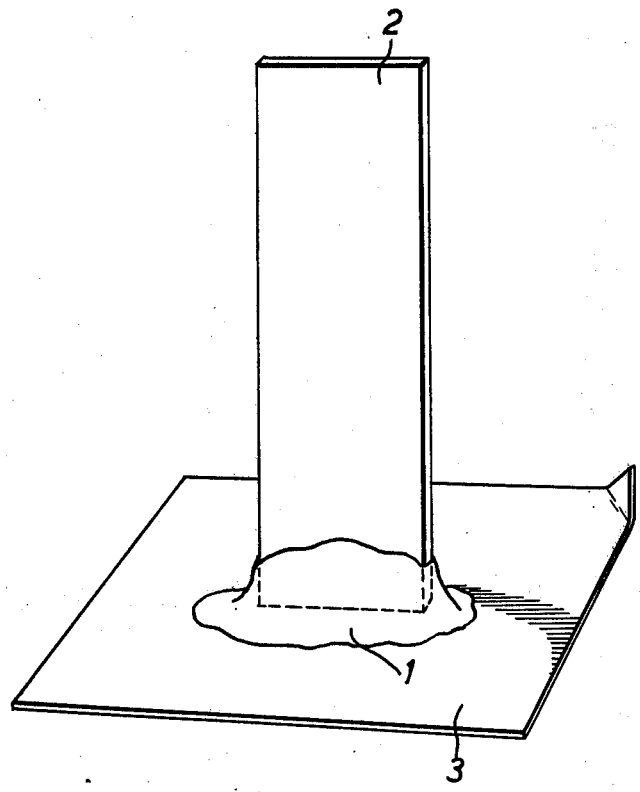
FIG. 1 shows a perspective view of a "T-piece" test specimen.

Referring to FIG. 1, a number of soft solder alloys 1 were employed to form soldered joints between the horizontal and vertical members 3 and 2 respectively of "T-piece" test specimens where at least one of the two members was either aluminium or an aluminium alloy. The nominal compositions of the aluminium alloys used in these "T-pieces" are set out in Table 1. In Table 1 the designations S1C, N4, N8, H9, H15 and H30 refer to aluminium alloys described in British Standard No. 1470, while the numbers 3003, 5052 and 6061 are United States AA standard aluminium alloys. Either four or six similar "T-piece" test specimens were prepared for each combination of aluminium or aluminium alloy and solder alloy recorded in Table 1. An organic flux of the type described above was used in the soldering process. The soldered joints were tested for resistance to electrolytic corrosion as follows. Of each set of four similar specimens, two were stored in normal office ambient conditions and two were stored by immersion in a standard synthetic brine solution at ambient temperature. The standard synthetic brine solution is described in British Standard No. 2011; Part 2K: 1963 and has the composition:

| Sodium chloride | 27 g |
|---|---|
| Anhydrous magnesium chloride | 6 g |
| Anhydrous calcium chloride | 1 g |
| Potassium chloride | 1 g |
| Distilled water to form | 1 litre |

The specimens were not subjected to any externally applied stress during the test. When six similar test specimens were available, four were treated as described above and the remaining two specimens were stored in a Long Term Damp Heat test enclosure (40°±2° C., 90–95% R.H. according to British Standard No. 2011, part 2C).

It is usual in practical soldering to remove deliquescent flux residues immediately after soldering by washing the soldered joints in water. In order to reproduce the conditions of practical soldering as far as is consistent with a simple accelerated corrosion test, the freshly soldered test pieces were, unless stated, all washed in cold water before being introduced into the test conditions. It was also considered that the washing step served to make the test results more reproducible by reducing the possibility of (a) changes in electrolyte composition due to the presence of spurious ionic species originating from the flux residues and (b) reaction between the brine solution and the flux residues at the joint site which might change the initial concentration of brine salts at the joint site. The joints were visually examined periodically, and a failure noted when the two members lost mechanical contact and parted under their own weight or upon applying light pressure with a probe.

Blank spaces in the Tables indicate that the joints did not fail during the test which, when the data given in the Tables were recorded, had been in progress for 450 days in the case of Table 2, 400 days in the case of Table 3, 300 days in the case of Table 4 and 200 days in the case of Table 5. Office storage was used as a control condition, to show whether failure of a particular solder composition was due to some intrinsic weakness or to the effects of the environment. The results recorded in Tables 2, 3 and 4 for joints between aluminium S1C and itself and, in Table 2, between aluminium S1C and copper, show that under normal office storage conditions there is no catastrophic intrinsic weakening of the joint at ambient temperature, whatever the composition of the solder alloy used. The results given in Table 2 show that Long Term Damp Heat gives a pattern of joint endurance similar to that produced by brine immersion, though it is extended over a longer time period. The brine test therefore seemed to be a satisfactory accelerated corrosion test and subsequently the Long Term Damp Heat test was omitted and no results therefor are given in Tables 3 and 4. The specimens were tested in duplicate in both brine and under office storage conditions.

Figure 2:
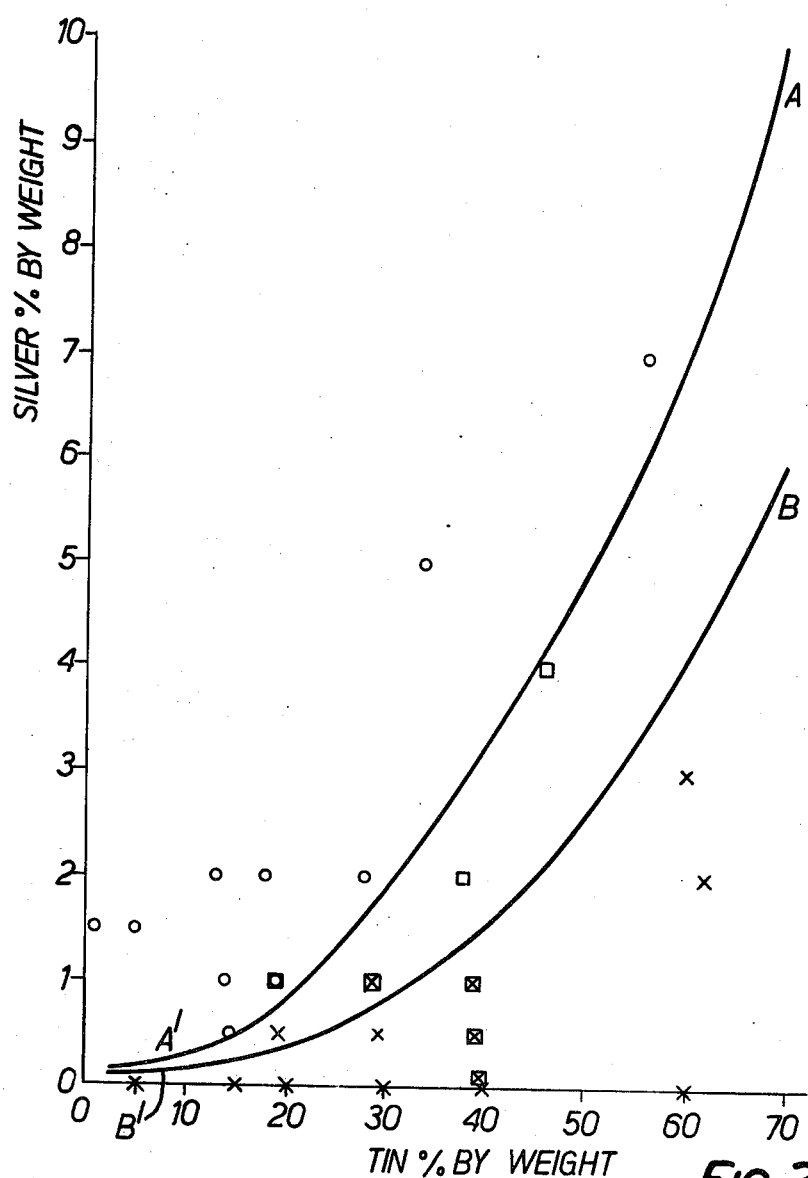
FIG. 2 is a graph of the variation of the corrosion resistance of various joints formed with soft solder alloys according to the tin and silver content of the soft solder alloy used to form the joint.

Tables 2 and 3 give the endurance of joints made with various tin-lead, lead-silver and tin-lead-silver solder alloys. The results are summarised in FIG. 2 from which it can be seen that those lead-silver and tin-lead-silver solders having compositions in the area above upper curve AA' usually retained their strength for long periods (over 200 days) of brine immersion. The tin-lead solders and tin-lead-silver solders having compositions in the area below lower curve BB' (which curve is represented by the expression $(Ag) = 0.1 + (5 \times 10^{-4})(Sn^2) + (1 \times 10^{-5})(Sn^3)$ where (Ag) and (Sn) are the percentages by weight of silver and tin respectively in the soft solder alloy) generally lost their strength completely within a comparatively short period (rarely more than 25 days) of brine immersion. Joints made of tin-lead-silver solders whose composition falls between upper and lower curves AA' and BB' respectively had intermediate, variable or uncertain endurance. In general, therefore, it is advisable to select the composition of the solder alloy to be inside the region above the upper curve AA' for satisfactory resistance of the soldered joint to this electrolytic corrosion test.

Immersion in 3% sodium chloride solution for 90 days has been recommended as a corrosion test; (see Y. Sugiyama and H. Irie, "Corrosion resistance of soldered joints in aluminium", Sumitomo Light Metal Technical Reports 1967, 8 (4), 23). It will be noted that the solder alloys tested in these investigations and having compositions above the upper curve AA' for the most part exceed this performance.

By way of example, in order that the soldered joint should have reasonable resistance to corrosion, the composition of the solder alloy should be such that the tin content does not exceed 18% if the silver content is 0.5%, the tin content should not exceed 25% if the silver content is 1%, the tin content should not exceed 35% if the silver content is 2%, the tin content should not exceed 45% if the silver content is 4% and the tin content should not exceed 60% if the silver content is 7%.

Table 4 shows the effect of electrolytic corrosion resistance in brine, of adding certain other metallic alloy components to an 18 tin- 80 lead- 2 silver solder alloy. It illustrates the very marked reduction in corrosion resistance of this solder alloy when significant quantities of bismuth, cadmium, antimony or zinc are present, but shows no such loss when 1% copper is present.

In a further series of tests there were formed organic-fluxed solder compositions, one of which comprised a tin-lead soft solder alloy and one of which comprised a tin-lead-silver solder alloy. The fluxed solder compositions were used to solder members of aluminium or aluminium alloy to other members of aluminium, one of its alloys or another metal. The soldered joints so formed were tested for corrosion resistance by immersing them in a synthetic brine solution as described above. For one set of test specimens such immersion was effected without first removing any flux residues from the vicinity of the soldered joints and for another set of joints flux residues were removed before immersion. The results, in Table 5, tend to suggest that the presence of organic flux residues has little effect on the corrosion resistance of the soldered joints.

Table 5 gives the results of a comparison between joints made with 30 tin- 70 lead and 24 tin- 2 silver- 74 lead solders, (solder alloys 32 and 43 respectively), the joint members being chosen from particular aluminium alloys and from other metals as shown. It is apparent from the results shown in Table 5 that the silver-bearing solder alloy 43 provides greater corrosion resistance than the tin-lead alloy 32. However, the improvement was much less marked where one of the joint members is of N8 or H15 alloy, particularly when the other joint member is not itself an aluminium alloy.

TABLE 1

COMPOSITIONS OF ALUMINIUM ALLOYS

| Designation of Alloy | Aluminium | Copper | Magnesium | Silicon | Iron | Manganese | Zinc | Titanium | Chromium | Additional restraints on composition. |
|---|---|---|---|---|---|---|---|---|---|---|
| 310 | 99.0 minimum | 0.10 | — | 0.5 | 0.7 | 0.1 | 0.1 | — | — | Cu+Si+Fe+Mn+Zn=1 |
| 3003 | rem. | 0.20 | — | 0.6 | 0.7 | 1.0 to 1.5 | 0.10 | — | — | |
| 5052 | rem. | 0.10 | 2.2–2.8 | (Si + Fe = 0.45) | | 0.10 | 0.20 | — | 0.15–0.35 | |
| 6061 | rem. | 0.15–0.40 | 0.8–1.2 | 040–0.8 | 0.7 | 0.15 | 0.25 | 0.15 | 0.15–0.35 | |

TABLE 1-continued
COMPOSITIONS OF ALUMINIUM ALLOYS

| Designation of Alloy | Aluminium | Copper | Magnesium | Silicon | Iron | Manganese | Zinc | Titanium | Chromium | Additional restraints on composition. |
|---|---|---|---|---|---|---|---|---|---|---|
| N4  | rem. | 0.10       | 1.7–2.4 | 0.5     | 0.5  | 0.5     | 0.2 | 0.2  | 0.25 | Mn + Cr = 0.5 |
| W8  | rem. | 0.10       | 4.0–4.9 | 0.40    | 0.40 | 0.5–1.0 | 0.2 | 0.2  | 0.25 |  |
| H9  | rem. | 0.10 0.4–0.9 | 0.3–0.7 | 0.40  | 0.10 | 0.2     | 0.2 | 0.10 |      |  |
| H15 | rem. | 3.9–5.0    | 0.2–0.8 | 0.5–1.0 | 0.7  | 0.4–1.2 | 0.2 | 0.2  | 0.10 |  |
| H30 | rem. | 0.10       | 0.5–1.2 | 0.7–1.3 | 0.5  | 0.40–1.0| 0.2 | 0.2  | 0.25 |  |

The figures are given in wt% and are maxima unless otherwise indicated.

TABLE 2
COMPARISON OF TIN-LEAD AND TIN-LEAD-SILVER SOLDER ALLOYS

Days to failure of soldered "T-joint" test specimen between a commercial grade aluminum (SIC) horizontal member and either a commercial grade aluminium (SIC) or a copper vertical member.

| Reference of Alloy | Composition of Solder Alloys | | | OFFICE STORAGE | | LONG TERM DAMP HEAT | | BRINE IMMERSION | |
|---|---|---|---|---|---|---|---|---|---|
| | Sn | Pb | Ag | Aluminium | Copper | Aluminium | Copper | Aluminium | Copper |
| 1  | 100  | —    | —   |    |    | 107 | 10  | 107 | 40  | 4  | 4  | 4  | 4  |
| 2  | 60   | 40   | —   |    |    | 40  | 40  | 107 | 107 | 19 | 7  | 19 | 7  |
| 3  | 40   | 60   | —   |    |    | 40  | 40  | 40  | 40  | 19 | 11 | 19 | 19 |
| 4  | 15   | 85   | —   |    |    | 39  | 39  | 39  | 39  | 4  | 4  | 19 | 6  |
| 5  | 5    | 95   | —   |    |    | 18  | 39  | 39  | 39  | 4  | 4  | 4  | 4  |
| 6  | —    | 97.5 | 2.5 |    |    |     |     |     |     |    |    |    |    |
| 7  | 1.0  | 97.5 | 1.5 |    |    |     |     |     |     |    |    |    |    |
| 8  | 96.5 | —    | 3.5 |    |    | 40  | 40  | 40  | 40  | 4  | 4  | 19 | 6  |
| 9  | 62   | 36   | 2   | 40 |    | 40  | 40  | 40  | 15  | 19 | 19 | 8  |    |
| 10 | 39   | 60   | 1   |    |    | 40  | 40  | 40  | 107 | 40 | 11 | 40 | 40 |
| 11 | 14   | 84   | 1   |    |    |     |     |     |     |    |    |    |    |
| 12 | 5    | 93.5 | 1.5 |    |    |     |     |     |     |    |    |    |    |
| 13 | 39.9 | 60   | 0.1 |    |    | 40  | 40  | 40  | 40  | 19 | 19 | 40 | 40 |
| 14 | 39.5 | 60   | 0.5 |    |    | 40  | 40  | 40  | 40  | 40 | 19 | 19 | 19 |
| 15 | 38   | 60   | 2   |    |    | 40  | 40  |     |     | 40 | 40 | 40 | 82 |

TABLE 3
Comparison of Tin-Lead and Tin-Lead-Silver Solder Alloys

| Reference of Alloy | Composition of Solder Alloys | | | Days to failure of soldered "T-joint" test specimens between horizontal and vertical members of a commercial grade aluminium (SIC) | |
|---|---|---|---|---|---|
| | Sn | Pb | Ag | Office Storage | Brine Immersion |
| 04 | 15   | 85 | —   | 1½  | 1½  |
| 16 | 14.5 | 85 | 0.5 |     | 217 |
| 11 | 14   | 85 | 1   |     |     |
| 17 | 13   | 85 | 2   | 277 |     |
| 31 | 20   | 80 | —   | 6½  | 6½  |
| 19 | 19.5 | 80 | 0.5 | 6½  | 6½  |
| 20 | 19   | 80 | 1   |     | 32  |
| 21 | 18   | 80 | 2   |     |     |
| 32 | 30   | 70 | —   | 1½  | 4   |
| 23 | 29.5 | 70 | 0.5 | 6½  | 6½  |
| 24 | 29   | 70 | 1   | 6½  | 29  |
| 25 | 28   | 70 | 2   |     | 217 |
| 26 | 60   | 37 | 3   | 6½  | 6½  |
| 27 | 46   | 50 | 4   | 28  | 30  |
| 28 | 56   | 37 | 7   |     |     |
| 29 | 34   | 61 | 5   | 234 |     |

TABLE 4
COMPARISON OF TIN-LEAD, TIN-ZINC, and TIN-LEAD-SILVER SOLDER ALLOYS WITH TIN-LEAD-SILVER ALLOYS HAVING VARIOUS ADDITIONAL ELEMENTS Days to failure of soldered "T-joint" test specimens between horizontal and vertical members of a commercial grade aluminum (SIC)

| Reference of Alloy | Sn | Pb | Ag | Others | Office Storage | Brine Immersion |
|---|---|---|---|---|---|---|
| 21 | 18 | 80    | 2 |                                | 109 |     |
| 25 | 28 | 70    | 2 |                                |     |     |
| 30 | 30 | 68    | — | 2 Cd                           | 4   | 4   |
| 31 | 20 | 80    |   |                                | 4   | 4   |
| 32 | 30 | 70    |   |                                | 4   | 4   |
| 33 | 18 | 70    | 2 | 10 Bi                          | 11  | 68  |
| 34 | 18 | 70    | 2 | 10 Cd                          | 109 | 4   |
| 35 | 18 | 79    | 2 | 1 Cu                           |     | 221 |
| 36 | 18 | 78    | 2 | 2 Sb                           | 0   | 4   | 0 |
| 37 | 18 | 70    | 2 | 10 Zn                          | 4   | 4   |
| 38 | 18 | 74.25 | 2 | 2.5 Cd, 0.25 Cu, 0.5 Sb, 2.5 Zn | 20  | 109 |
| 39 | 90 | —     | — | 10 Zn                          | 20  | 126 |
| 40 | 80 | —     | — | 20 Zn                          | 4   | 4   |
| 41 | 70 | —     | — | 30 Zn                          | 20  | 11  |

TABLE 5

COMPARISON OF SOLDER ALLOY 32 (30 Sn 70 Pb) AND SOLDER ALLOY 43 (24 Sn 74 Pb 2 Ag) ON VARIOUS JOINT-MEMBER ALLOYS

For each type of horizontal joint member, the upper line of results refers to joints from which flux residue had been removed before immersion in the brine. The lower line of results relates to joints from which the flux residue had not been removed before immersion.

Days to failure during brine immersion, of soldered "T-joint" test specimens

| Designation of vertical member | Designation of horizontal member | Cu 43 | Cu 32 | Brass 43 | Brass 32 | Ni 43 | Ni 32 | Steel 43 | Steel 32 | Stainless Steel 43 | Stainless Steel 32 | N8 43 | N8 32 | H9 43 | H9 32 | H15 43 | H15 32 | H30 43 | H30 32 | SIC 43 | SIC 32 | 3003 43 | 3003 32 | 5052 43 | 5052 32 | 6051 43 | 6051 32 |
|---|---|---|---|---|---|---|---|---|---|---|---|---|---|---|---|---|---|---|---|---|---|---|---|---|---|---|---|
| N4 | | | 4½ | | 4½ | 115 | 4½ | 132 | 1½ | | 1½ | | | | | | | | | | 1½ | | 1½ | | | 43 | 32 |
| | | | 4½ | | 1½ | 57 | 4½ | 152 | 4½ | | 4½ | | | | | | | | | 115 | 1½ | 57 | 40 | | | | |
| N8 | | 19 | 1½ | 19 | 1½ | 4½ | 1½ | 19 | 1½ | 19 | 1½ | 57 | 4½ | 33 | 1½ | | 1½ | 57 | 1½ | 17 | 1½ | 40 | 1½ | 132 | 1½ | 19 | 1½ |
| | | 19 115 | 1½ | 19 | 1½ | 19 | 1½ | 26 | 1½ | 19 | 1½ | 19 | 1½ | 26 | 1½ | 19 | 1½ | 19 | 1½ | 33 | 1½ | 40 | 1½ | 26 | 1½ | 19 | 1½ |
| | | 40 0 | 1½ 1½ | 47 132 | 1½ 4½ | 132 170 | 1½ 4½ | 152 170 115 | 4½ 4½ | 37 26 | 7 1½ | | 26 | | 1½ 1½ | 63 33 | 1½ 1½ | | 1½ 1½ | 183 | 1½ 1½ | 40 40 | 1½ 1½ | 176 132 | 1½ 1½ | 176 | 1½ 1½ |
| H15 | | 26 19 | 4½ 1½ | 19 19 | 1½ 1½ | 19 19 | 4½ 4½ | 26 19 | 7 1½ | 25 26 | 7 4½ | | | | | 63 33 | 7 7 | 57 152 | 7 26 | 132 115 | 7 7 | 132 176 132 | 1½ 19 | 47 115 | 19 7 | 115 162 | 19 7 |
| H30 | | 17 | 1½ | | 1½ | 17 | 1½ | 33 | 1½ | 33 | 1½ | | | | | | | 152 | 1½ | | 1½ | 40 | 1½ | | 1½ | 176 | 1½ |
| SIC | | 57 | 1½ 4½ 4½ | | 1½ 4½ 7 | 115 26 152 | 1½ 4½ 4½ | 40 115 170 | 1½ 1½ 4½ | 115 | 1½ 4½ 4½ | | | | | | | 57 | 1½ | 115 | 1½ 7 1½ | 10 | 1½ 4½ 4½ | 115 1½ | 1½ 1½ 1½ | 57 | 1½ |

We claim:

1. A method of soft soldering a first member whose composition comprises a major proportion by weight of aluminum to a second member of a metal or alloy which is capable of being soft soldered to aluminum at a joint site, which method comprises the steps of (1) disposing the first and second members in the positions in which they are to be soldered together at a joint site, (2) providing at said joint site in association (a) a soft solder alloy having a liquidus melting temperature of less than 300° C., said alloy consisting essentially of at least 35% by weight of lead, greater than 10% by weight of tin, from 0-3% of copper, and silver with the relative amounts of silver and tin in said alloy being such that said amounts of silver and tin are within the area above the curve AA' in FIG. 2 of the drawings, and (b) a flux suitable for use in aluminum soldering selected from organic fluxes and reaction fluxes, and (3) soldering together at said joint site said first and second members.

2. A method as claimed in claim 1, wherein said flux is an organic flux comprising:
    (a) an amine, and
    (b) a member selected from the group consisting of fluoboric acid, salts of fluoboric acid, alkali metal halides, and ammonium halides.

3. A method as claimed in claim 2, wherein said organic flux comprises diethylenetriamine and a member selected from the group consisting of ammonium fluoborate, zinc fluoborate, lithium chloride, sodium fluoride and ammonium chloride.

4. A method as claimed in claim 2, wherein said organic flux further comprises a metal oxide.

5. A method as claimed in claim 4, wherein said metal oxide is selected from the group consisting of zinc oxide and cadmium oxide.

6. A method according to claim 1, wherein said soft solder alloy and said flux are provided simultaneously at said joint site in the form of a fluxed solder composition consisting of said alloy and said flux.

7. A method according to claim 6, wherein said fluxed solder composition is in the form of a flux cored solder.

8. A method according to claim 1, wherein said flux is a reaction flux comprising a heavy metal chloride.

9. A method according to claim 8, wherein said heavy metal chloride is selected from the group consisting of stannous chloride and zinc chloride.

10. A method as claimed in claim 8, wherein said reaction flux further comprises at least one member selected from the group consisting of alkali metal halides and ammonium halides.

11. A method as claimed in claim 8, wherein said reaction flux further comprises at least one member selected from lithium chloride, sodium chloride, and ammonium chloride.

12. A method as claimed in claim 8, wherein said reaction flux further comprises at least one member selected from hydrazine hydrochloride and oleic acid.

13. A method as claimed in claim 8, wherein said reaction flux further comprises at least one member selected from the group consisting of reducing agents and wetting agents.

14. A solder joint formed by a method according to claim 1.

* * * * *